US011060194B2

(12) United States Patent
Deshpande et al.

(10) Patent No.: US 11,060,194 B2
(45) Date of Patent: Jul. 13, 2021

(54) METHODS FOR PRODUCING COMPOSITE STRUCTURES USING DIFFUSION OR THERMAL REACTIONS OF A PLURALITY OF LAYERS

(71) Applicant: The United States of America as represented by the Secretary of the Navy, Crane, IN (US)

(72) Inventors: Nishkamraj U. Deshpande, Novi, MI (US); Daniel R. Crowley, Odon, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 431 days.

(21) Appl. No.: 15/849,657

(22) Filed: Dec. 20, 2017

(65) Prior Publication Data

US 2019/0017176 A1 Jan. 17, 2019

Related U.S. Application Data

(60) Provisional application No. 62/437,648, filed on Dec. 21, 2016.

(51) Int. Cl.
*C23C 28/02* (2006.01)
*F41A 21/02* (2006.01)
(Continued)

(52) U.S. Cl.
CPC .......... *C23C 28/021* (2013.01); *B32B 15/015* (2013.01); *C23C 8/60* (2013.01);
(Continued)

(58) Field of Classification Search
None
See application file for complete search history.

(56) References Cited

U.S. PATENT DOCUMENTS 3,899,306 A * 8/1975 Knopp ................. B23K 1/0006
428/652
4,577,431 A 3/1986 Siemers et al.
(Continued)

OTHER PUBLICATIONS

D.B. Miracle, O.N. Senkov / Acta Materialia 122 (2017) 448e511 A critical review of high entropy alloys and related concepts.
(Continued)

*Primary Examiner* — George Wyszomierski
(74) *Attorney, Agent, or Firm* — Naval Surface Warfare Center, Crane Division; Christopher A. Monsey

(57) ABSTRACT

Apparatuses and methods of manufacturing of thermally formed composite structures, such as a projectile firing structure, are provided. One simplified exemplary method includes: determining material properties of a projectile firing structure comprising a rifled barrel including thermal conductivity, wear, and tensile strength; wrapping a plurality of thermally reactive layers onto a cylindrical press form structure, the cylindrical press form structure comprising a plurality of spiraled grooves and lands, the thermally reactive layers comprising metal or metal oxides that when heated produce thermal diffusion byproducts in a composite structure forming the rifled barrel having the plurality of material properties; disposing an enclosing structure around the thermally reactive layers wrapped around the cylindrical press form structure; and heating the plurality of thermally reactive layers at a temperature and time so that the plurality of thermally reactive layers thermally react via thermal diffusion forming the rifled barrel having the plurality of material properties.

2 Claims, 11 Drawing Sheets

(51) Int. Cl.
*B32B 15/01* (2006.01)
*C23C 8/60* (2006.01)
*C23C 10/28* (2006.01)
*C23C 8/68* (2006.01)

(52) U.S. Cl.
CPC ................ *C23C 8/68* (2013.01); *C23C 10/28* (2013.01); *C23C 28/027* (2013.01); *F41A 21/02* (2013.01); *B32B 2571/02* (2013.01); *B32B 2597/00* (2013.01)

(56) References Cited

U.S. PATENT DOCUMENTS

| | | | | |
|---|---|---|---|---|
| 5,466,537 | A | * | 11/1995 | Diede ........................ F02K 9/38 102/364 |
| 5,935,351 | A | | 8/1999 | Sherman et al. |
| 5,954,895 | A | * | 9/1999 | Dumez ................... B22F 7/064 148/515 |
| 2009/0304315 | A1 | | 12/2009 | Johnson |
| 2013/0180758 | A1 | * | 7/2013 | Holloway ............ B22D 11/005 174/128.1 |
| 2013/0330567 | A1 | * | 12/2013 | Woll ..................... C23C 28/023 428/548 |

OTHER PUBLICATIONS

Ikornikov et al. InSitu Formation of Cast Granules in Thermit-Type SHS Reactions. Article in International Journal of Self-Propagating High-Temperature Synthesis • Mar. 2011.

Hardt et al. Propagation-of-gasless-reactions-in-solidsii-experimental-study-of-exothermic reaction rates. Combustion and Flame 21, 91-97 (1973).

D.P. Adams. Reactive multilayers fabricated by vapor deposition: A critical review. Thin Solid Films 576 (2015) 98-128. Sandia National Laboratories, Albuquerque, NM 87185, United States.

Cervantes et al. Activation Energy of Tantalum-Tungsten Oxide Thermite Reaction—Combustion and Flame. Lawrence Livermore National Security, LLC LLNL-JRNL-425030. Mar. 3, 2010.

* cited by examiner

97 — Determine material properties and dimensions of an interdiffusion reaction produced intermetallic alloyed composite structure comprising interdiffusion reaction products formed from the interdiffusion reaction of a plurality of layers (e.g., thin layers having exemplary thicknesses of, e.g., 0.016 mm to 0.025 mm), the plurality of layers comprising metal layers, metal oxide layers, or combinations of metal and metal oxide layers, the intermetallic alloyed composite structure (e.g., rifle barrel) is formed to internally receive and rotatably convey a projectile structure along a center axis running through the intermetallic alloyed structure using a combustion gas byproduct passed through the alloyed composite structure, the material properties including high temperature properties (e.g., melting point from application of one or more propellant combustion byproducts and friction from passage of the projectile), hardness, high temperature tensile strength, heat transfer or thermal conductivity properties, creep strength, wear resistance against a specified material (e.g., the projectile passing against or through the alloyed composite structure a specified times and frequency), and/or equivalent heat treatment properties, etc;

99 — Selecting each of the plurality of layers that are combined to produce the intermetallic alloyed composite structure using the interdiffusion reaction (e.g, heat reaction such as, e.g., thermite reaction) that produces the predetermined interdifusion reaction products within the intermetallic alloyed composite structure with the material properties, wherein the plurality of layers comprise a first, second and third layer, the dimensions comprising a thickness from at least one rifling land or groove within the intermetallic alloyed composite structure to an outer surface of the intermetallic alloyed composite structure 100 — Selecting and providing the first layer to produce the interdiffusion reaction products with the second and third layer comprising one of, e.g., a first aluminum thin foil layer, tantalum thin foil layer, or tungsten thin foil layer;

102 — Selecting and disposing the second layer or a metal oxide onto the first layer that is selected to produce the interdiffusion reaction products with the first and third layer comprising one of, e.g., disposing a nickel thin foil layer onto the first aluminum thin foil layer; or electroplating a nickel alloy metal layer onto the first layer comprising the first aluminum thin foil layer by disposing nickel oxide NiO particles onto the first layer comprising the first aluminum thin foil layer; or application of a titanium oxide TiO2 surface coating on the first layer comprising the first aluminum thin foil layer; or disposing tungsten oxide WO3 coating on the first aluminum thin foil or the tantalum thin foil layer; or disposing a cobalt oxide CoO coating on the first aluminum thin foil layer;

104 — Selecting and disposing the third layer on the second layer that is selected to produce the interdiffusion reaction products with the first and second layer comprising one of, e.g., a second aluminum thin foil layer onto the nickel thin foil layer; or an application of boron oxide B2O3 nano fibers on the titanium oxide TiO2 surface coating; or disposing a tantalum thin foil layer on the tungsten oxide WO3 coating; or disposing a third aluminum thin foil layer on the coating; cobalt oxide CoO coating;

Fig. 7A

105 — Providing a cylindrical form structure 1 formed with a plurality of spiraled or rifled the lands 5 and grooves 3 that define and correspond to an interior wall of the intermetallic alloyed composite structure that is adapted to internally receive and rotatably convey the projectile structure therein using the combustion gas byproduct, the cylindrical form structure 1 has a protective coating applied to an outer surface of the cylindrical form 1 that forms a protective refractory coating or barrier that prevents interdiffusion reaction bonding between the cylindrical form structure 1 and the plurality of layers, wherein the cylindrical form structure diameter and shape are selected based on an application comprising manufacturing of a projectile system, e.g. the rifle barrel, configured to rotatably receive the projectile structure;

107 — Disposing lengths of the plurality of layers into a composite layer structure 31 and wrapping the composite layer structure 31 onto an outer surface of the cylindrical form structure 1 comprising the lands 5 and grooves 3 structure and then pressing the composite layer structure 31 into and onto the grooves 3 and lands 5 respectively by, e.g., cold/hot rolling or hydroforming, so that the composite layer structure 31 is pressed into the grooves 3 and onto the lands 5 of the cylindrical form structure 1, wherein the lengths of the plurality of layers are such that the wrapping of the composite layer structure 31 continues until gaps defined by distances between sides of the plurality of layers disposed in the grooves of the cylindrical form structure 1 are filled with portions of the plurality of layers, the lengths of the plurality of layers are further defined by lengths required to produce a predetermined width of another portion of the plurality of layers from an outer surface of at least one of the lands to an external surface of the composite layer structure 31 after the wrapping step is completed, wherein the predetermined width is further determined based at least in part on one or more of the material properties of the alloyed composite structure, wherein optionally the composite layer structure further comprises an additional plurality of layers that include different or additional layers which are added or disposed via an additional wrapping step on top of or as an extension thereof to the first, second and third layers so that an outer section of the composite layer structure has different one or more of the material properties than the first, second, and third layers than the first, second, or third layers, wherein the different one or more of the material properties comprise, e.g., a different heat transfer, hardness, creep strength, or heat expansion, form factor affecting material properties such as heat transfer due to tapering of a portion of the composite structure;

Fig. 7B

112 — wherein when the first layer comprises the first aluminum thin foil layer, the first aluminum thin foil layer is coated with the Nickel Oxide NiO particles, heating the composite structure 31 at sufficiently high temperature for a predetermined time to cause a thermite reaction:
$$3NiO + 2Al \longrightarrow 3Ni + Al_2O_3 + \Delta H$$
and subsequent interdifussion reaction between the aluminum and nickel layer to for intermetallic compounds and Aluminum oxide $Al_2O_3$ particles to produce the interdiffusion reaction produced intermetallic alloyed composite structure.

114 — Wherein when the second layer comprises $TiO_2$, heating composite structure 31 at a sufficiently high temperature for a specified time sufficient to cause a thermite reaction:
$$3TiO_2 + 4Al \longrightarrow 3Ti + 2Al_2O_3 + \Delta H$$
and subsequent interdifussion reaction between the aluminum and titanium layers to form intermetallic compounds of titanium and aluminum, and aluminum oxide $Al_2O_3$ particles to produce the interdiffusion reaction produced intermetallic alloyed composite structure.

116 — wherein when the third layer comprises an application of $B_2O_3$ nano fibers on the second layer which comprises the $TiO_2$ surface coating, heating the composite structure 31 at a sufficiently high temperature for a sufficient time to cause a thermite reaction
$$3TiO_2 + 3B_2O_3 + 10Al \longrightarrow 3TiB_2 + 5Al_2O_3 + \Delta H$$
and subsequent interdifussion reaction between the aluminum and titanium with heat of reaction $\Delta H$ to form intermetallic compounds of Titanium and Aluminum, and Aluminum oxide $Al_2O_3$ and $TiB_2$ particles to produce the interdiffusion reaction produced intermetallic alloyed composite structure.

Fig. 7D wherein when the first alloy metal layer comprises the tantalum, the second layer comprises the tungsten oxide $WO_3$, and the third metal alloy layer comprises the tantalum;

wherein the heating step comprises heating the first, second, and third layers for a particular time to initiate a thermite type reaction and reaction heat and reaction products comprising:

$$3Fe_3O_4 + 8Al \longrightarrow 9Fe + 4Al_2O_3 + \Delta H$$

$$6Ta + 5WO_3 \longrightarrow 3Ta_2O_5 + 5W + \Delta H$$

$$2Al + WO_3 \longrightarrow Al_2O_3 + W + \Delta H$$

$$Ta_2O_5 + 3.33Al = 2Ta + 1.67 Al_2O_3 + \Delta H$$

and subsequent interdifussion reaction between the first layer comprising the tantalum, the second layer comprising the tungsten oxide $WO_3$, and the third layer comprising the tantalum layer to produce the interdiffusion reaction produced intermetallic alloyed composite structure.

METHODS FOR PRODUCING COMPOSITE STRUCTURES USING DIFFUSION OR THERMAL REACTIONS OF A PLURALITY OF LAYERS

CROSS-REFERENCE TO RELATED APPLICATION

This application is a Non Provisional application which claims priority to U.S. Provisional Patent Application Ser. No. 62/437,648, filed on Dec. 21, 2016, entitled METHODS FOR PRODUCING COMPOSITE STRUCTURES USING DIFFUSION OR THERMAL REACTIONS OF A PLURALITY OF LAYERS, the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,400) is assigned to the United States Government and is available for licensing for commercial purposes. Licensing and technical inquiries may be directed to the Technology Transfer Office, Naval Surface Warfare Center Crane, email: Cran_CTO@navy.mil

BACKGROUND AND SUMMARY OF THE INVENTION

The field of this invention includes methods for producing composite structures, such as a rifled barrel, using thermal diffusion or thermal reactions of a plurality of layers that can include metals or metal oxides which have desired material properties.

A need exists to provide improved methods of manufacturing of various structures such as rifled gun barrels.

Apparatuses and methods of manufacturing of thermally formed composite structures, such as a projectile firing structure, are provided. One simplified exemplary method includes: determining material properties of a projectile firing structure comprising a rifled barrel including thermal conductivity, wear, and tensile strength; wrapping a plurality of thermally reactive layers onto a cylindrical press form structure, the cylindrical press form structure comprising a plurality of spiraled grooves and lands, the thermally reactive layers comprising metal or metal oxides that when heated produce thermal diffusion by-products in a composite structure forming the rifled barrel having the plurality of material properties; disposing an enclosing structure around the thermally reactive layers wrapped around the cylindrical press form structure; and heating the plurality of thermally reactive layers at a temperature and time so that the plurality of thermally reactive layers thermally react via thermal diffusion forming the rifled barrel having the plurality of material properties. Exemplary methods can also be used in biological and electronic applications.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 7A-7E show exemplary methods of manufacturing in accordance with various embodiments of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

The present invention relates to design and production of composite structures, such as a gun barrel, having varying material properties through one or more thickness sections of the composite structure (e.g. barrel) from an inner section (e.g. inside side wall) to an outside surface.

Generally, a need exists to provide improved, more flexible and rapid manufacturing of various structures such as a rifle barrel which exhibit various material properties that existing manufacturing capabilities do not provide. In this example, while an inner surface of the gun barrel needs to have higher thermal and wear resistance, the rest of the barrel thickness may need to possess different or increased heat transfer properties. In one exemplary embodiment of the invention, a process in accordance with at least one embodiment of the invention can provide a desired structure having desired differing properties can be made by sandwiching and spiral binding thin foils of different reactive materials e.g. A, B, C, and D in combinations such as A/B/A/B/C/D/C/D etc., where the reactive material's sandwiched layers would bond to each other under the action of supplied energies like thermal, electrical, microwave, etc. These reactive materials can be thermite type layers which generate an exothermic reaction heat. This heat can be used for making bonds between the various layers of the spiral roll. Thus, for example, initial layers of an inner core of a spiral can be made using high temperature metal or alloy of metals such as tantalum, tungsten in a multilayer such as, $Al/Ta_2O_5/Al$, $Al/WO_3/Al$, or $Ni/Al/Ni/Al$ formed into a multilayered rolled or wrapped structure around a form with desired topography as a few examples.

In at least one exemplary embodiment, generally a set of layers with predetermined material properties are disposed onto an exemplary form with spiraled grooves and lands which are heat reactively formed via e.g. thermal interdiffusion, into a desired barrel structure.

Figures 1A, 1B:
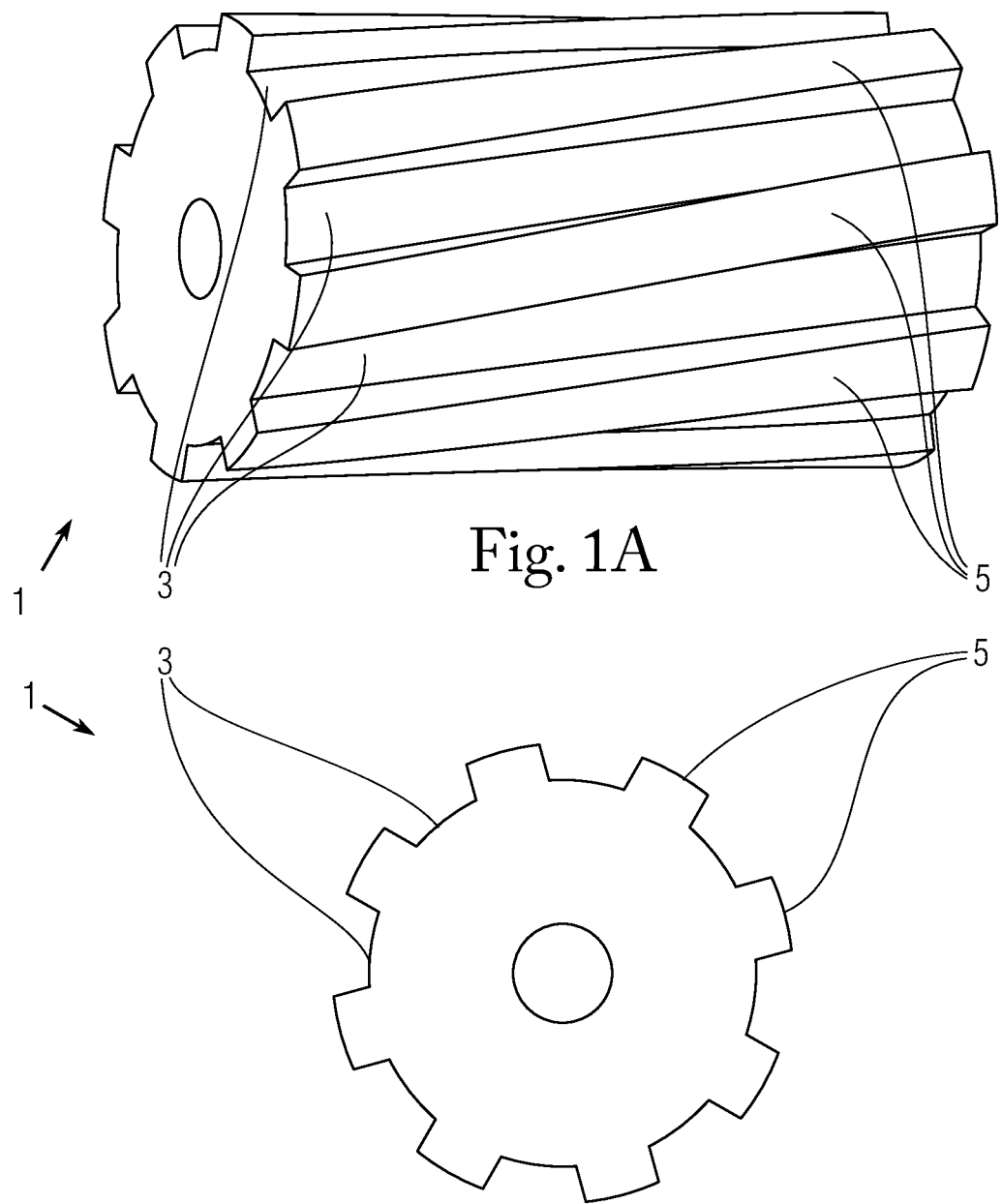
FIG. 1A shows an exemplary spiral form structure of a form structure with spiraled grooves and lands used in making a composite structure.
FIG. 1B shows an end view of the FIG. 1A spiral form structure.

Another embodiment can include forming different sections of a desired composite structure (e.g. rifle barrel) after disposing multiple sets of composite layers, each having desired material properties after being subjected to a desired heat reactive formation process such as thermal diffusion processing. For example, an initial set of high temperature resistant layers on a form, such as shown in FIG. 1A, an initial or inner surfaces of the layers would be formed with spiral grooves and lands to make a rifled barrel, where an outward spiral layer materials away from this inner zone would be selected to have the metal/alloy/material combination having different required property such different or increased heat conduction and thus heat transfer. The multiple layer sets can be disposed as a sandwiched layered structure that is then exposed to heating that forms a desired structure such as rifled gun barrel type structure having differing through-thickness properties.

In another variation of an exemplary method, instead of employing Ta/Al/Ta/Al for making an inner layer of a gun barrel, an aluminum metal/alloy surface of a thin sheet structure can be coated with a thin nickel layer, and such nickel coated aluminum sheet can be sandwiched between two non-coated aluminum sheets and the sandwich containing these three sheets be mechanically pressed or rolled (either hot/cold) or hydroformed. Next, the mechanically held sandwiched layers can be exposed to high temperature generating a diffusion reaction between aluminum and nickel layers to produce high temperature resistant intermetallic compounds (such as NiAl as an example), containing sandwich structural laminate. Such a stack up of uncoated/bare and nickel coated aluminum sheets laminate can be made with as many required sheets to achieve the final product thickness. The aluminum and nickel in this case can be just one of many examples and this technique may not be limited to just these metals or materials. Subsequent layers of a desired structure such as a spiraled barrel can be chosen similar to as discussed above to achieve better heat transfer properties.

In another variation of an embodiment of the invention, a coating layer on an aluminum sheet may include nano or macro sized particles of NiO (Nickel Oxide) particles deposited on the aluminum surface as part of an electrolysis/electroplated nickel layer, or may be just NiO particles/fibers/sheets without anything else. Such coated aluminum sheet can be then sandwiched between two aluminum sheets and can be mechanically pressed/formed/rolled/hydroformed/shaped either in hot or cold condition and may subsequently be subjected to heat to cause thermite reaction as shown in Equation 1:

$$3NiO+2Al \rightarrow 3Ni+Al_2O_3+\Delta H \qquad \text{Equation 1}$$

producing exothermic heat of the reaction designated as $\Delta H$. An occurrence of this exothermic reaction induced heat and with additional heating the composite may help diffusion reactions between aluminum and the middle layer to produce high temperature intermetallic compounds such as NiAl (Nickel Aluminide) as an example. Thus, a resulting end product could include composite laminate consisting of reaction products such as aluminum oxide ($Al_2O_3$) particles either isolated or coagulated, NiAl or other Nickel-Aluminum alloy phases. Subsequent layers of the exemplary spiral barrel could be chosen similar to as discussed above to achieve better, different or increased heat transfer properties.

In another variation of an exemplary embodiment of the invention, a coating layer on the aluminum sheet may have nano or macro sized particles of $TiO_2$ (Titanium Oxide) particles/fibers be deposited on the aluminum surface as part of an aqueous electrodeposited layer using technology such Henkel's EC2 process. Such coated aluminum sheet can then be disposed or sandwiched between two aluminum sheets and can be mechanically pressed/formed/rolled/hydroformed/shaped either in hot or cold condition and may subsequently be subjected to heat to cause thermite reaction as discussed in Equation 2:

$$3TiO_2+4Al \rightarrow 3Ti+2Al_2O_3+\Delta H \qquad \text{Equation 2}$$

producing exothermic heat of the reaction designated as $\Delta H$. An occurrence of this exothermic reaction induced heat and with additional heating the composite may help diffusion reactions between aluminum and the middle layer to produce high temperature intermetallic compounds such as TiAl as an example. Generated heat may help produce intermetallic compounds such as TiAl (Titanium Aluminide). Thus, a resulting end product can include composite laminate comprising reaction products such as aluminum oxide ($Al_2O_3$) particles either isolated or coagulated, TiAl and/or other Titanium-Aluminum alloy phases. Subsequent layers of an exemplary spiral barrel could be chosen similar to as discussed above to achieve better, increased or different heat transfer properties.

In another variation of an exemplary embodiment of the invention, a coating layer on an aluminum sheet may have nano or macro sized particles of $TiO_2$ (Titanium Oxide) particles be deposited on the aluminum sheet's surface as part of an aqueous electrodeposited layer using technology such Henkel's EC2. On this $TiO_2$ coated surface, nano/macro sized fibers of Boric Oxide ($B_2O_3$) be deposited using, e.g., an electrospinning method. Such a coated aluminum sheet can then be sandwiched between two aluminum sheets and can be mechanically pressed/formed/rolled/hydroformed/shaped either in hot or cold condition and may subsequently be subjected to heat to cause thermite reaction as discussed in Equation 4:

$$3TiO_2+3B_2O_3+10Al \rightarrow 3TiB_2+5Al_2O_3+DH \qquad \text{Equation 3}$$

An excess amount of $TiO_2$ may also be used to produce a reaction zone comprising $TiAl+3TiB_2+5Al_2O_3$ and may produce fibrous Titanium Boride ($TiB_2$) fibers. Subsequent layers of a desired exemplary structure such as a spiral or rifled barrel could be chosen similar to as discussed above to achieve better, different or increased heat transfer properties.

Figure 2:
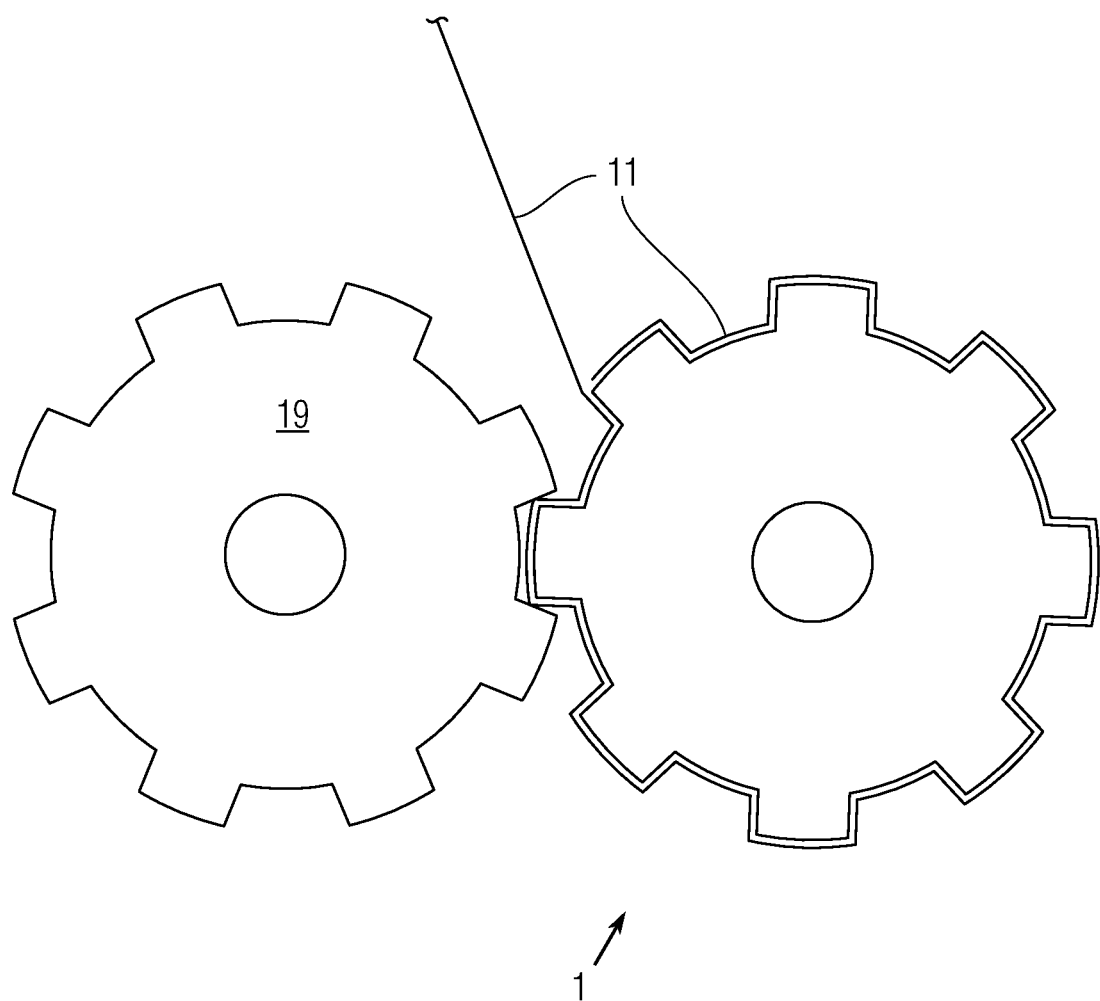
FIG. 2 shows an exemplary pressing guide gear or structure which is used to press or dispose reactive layers into or onto spiraled grooves of a form structure.

In another variation of an exemplary embodiment of the invention, high purity (>99.5%) powders of titanium and carbon can be spread on the thin foils or sheets of low carbon steel. Such a coated steel sheet can then be mechanically pressed/formed/rolled/hydroformed/shaped either in hot or cold condition as shown in FIG. 2 and may subsequently be subjected to heat to cause thermite reaction as discussed in Equation 4:

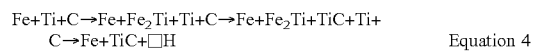

$$Fe+Ti+C \rightarrow Fe+Fe_2Ti+Ti+C \rightarrow Fe+Fe_2Ti+TiC+Ti+C \rightarrow Fe+TiC+\Delta H \qquad \text{Equation 4}$$

The resulting titanium Carbide compounds can reduce wettability and heat absorption.

Figure 5:
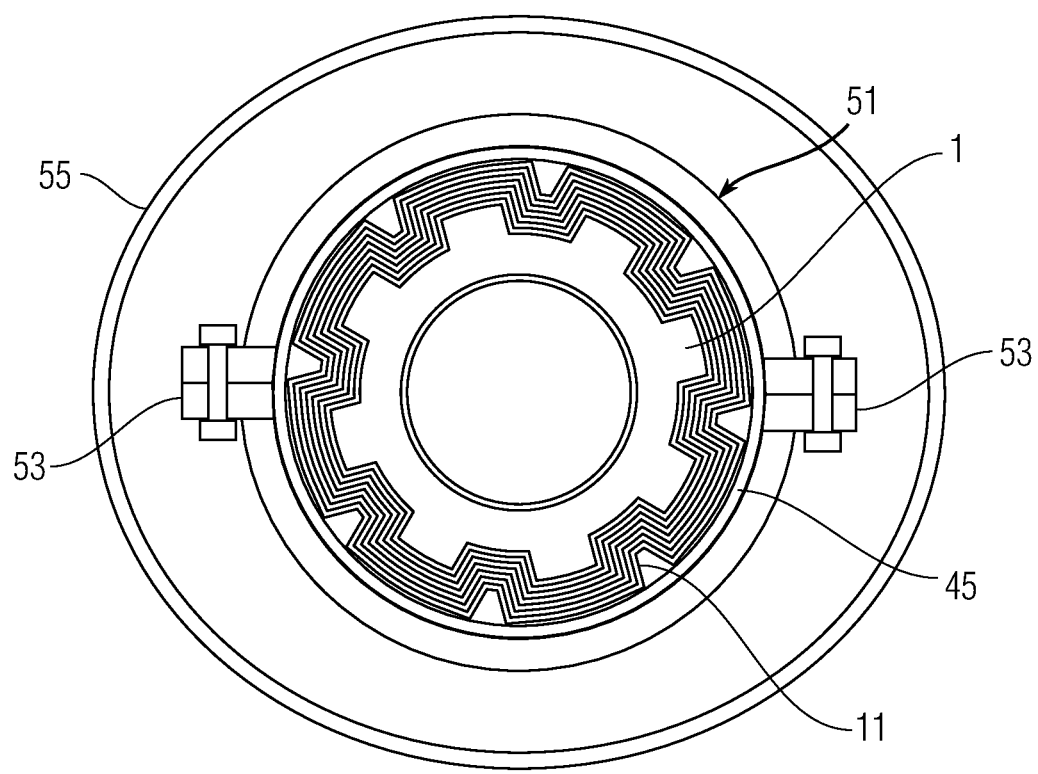
FIG. 5 shows an exemplary composite formation assembly including clamping restraints and an induction heating coil.
Figure 6:
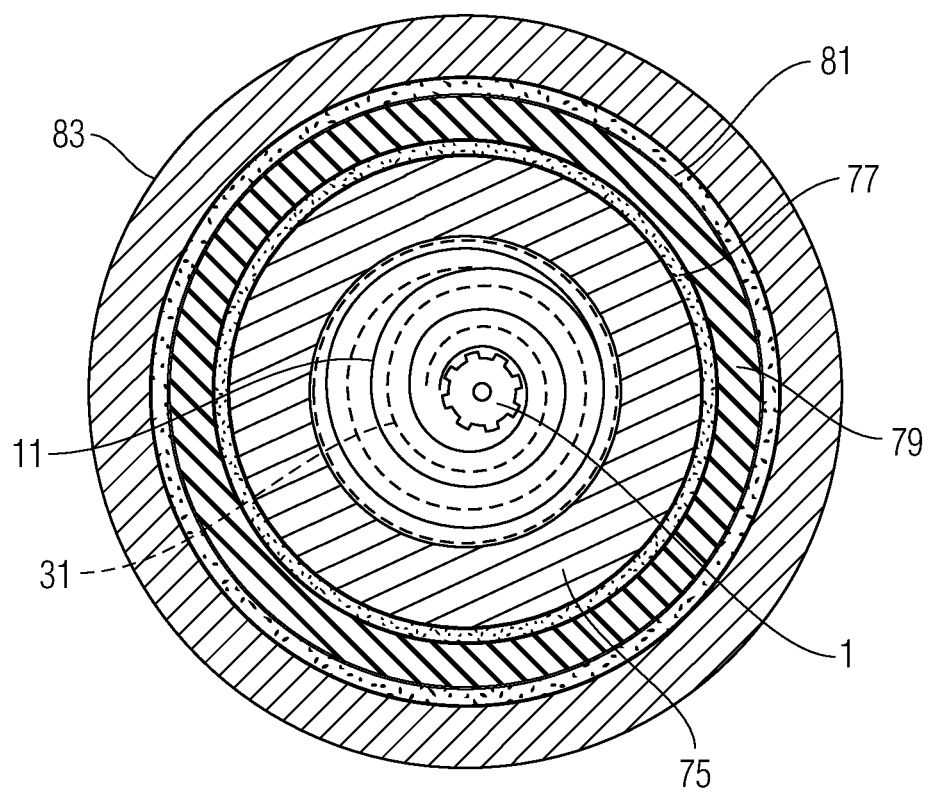
FIG. 6 shows an exemplary composite formation assembly including a plurality of tube layers and a plurality of reactive powder layers.

Subsequent layers of a desired exemplary structure such as a spiral or rifled barrel could be chosen similar to as discussed above to achieve better, different or increased heat transfer properties. For example the above steel composite with titanium carbide can be bonded to a nickel base superalloy tube designated as outside barrel as shown in FIGS. 5 and 6. This bonding be achieved by spreading a mixture of Titanium, Carbon and Nickel powders between the inner steel layers (which were bonded by the thermite reaction between Titanium and Carbon) and the inner surface of the Nickel base super alloy tube. To further achieve a better heat release from the outer surface of the nickel base superalloy tube, this tube be insert-bonded into a titanium tube by spreading a mixture of Titanium, Carbon and Nickel powders in the gap between the nickel alloy and titanium alloy tubes.

$$Ti+C+30 \text{ wt. \% } Ni=TiC+30 \text{ wt. \% } Ni+\square H \quad \text{Equation 5}$$

Despite the fact that some phases might be omitted due to the limitation of examination spots, a general plot of the SHS reaction mechanism in the Ni—Ti—C system can be established. The reaction sequence can be described as:

(1) $Ni+Ti+C \rightarrow$ (2) $Ti_2Ni+Ni+Ti+C \rightarrow$ (3) $Ti_2Ni+Ni_4Ti_3+Ti+Ni+C \rightarrow$ (4) the formation of Ni—Ti liquids (5) the formation and precipitation of TiC. Equation 6

The steel-nickel superalloy-titanium tube structure will be insert-bonded to copper tube to further enhance the heat transfer by using copper tubes having fins (similar to that used in heat exchanger). This bonding between the outer surface of the titanium tube and the inner surface of the finned copper tube will be by spreading commercial powders of Cu, titanium and carbon. The bonding reaction between the titanium and copper tube in the Cu—Ti—C system could be described as:

$$xCu+Ti+C=TiC+xCu+\square H \quad \text{Equation 7}$$

In another variation of an exemplary embodiment of the invention, high purity (>99.5%) powders of titanium and Boron Carbide ($B_4C$) be spread on the thin foils or sheets of low carbon steel. Such a coated steel sheet can then be mechanically pressed/formed/rolled/hydroformed/shaped either in hot or cold condition as shown in FIG. 2 and may subsequently be subjected to heat to cause thermite reaction as discussed in Equation 8:

$$3Ti+B_4C \rightarrow 2TiB_2+TiC+\square H \quad \text{Equation 8}$$

In another variation of an exemplary embodiment of the invention, high purity (>99.5%) powders of titanium, Carbon and Chromium be spread on the thin foils or sheets of low carbon steel. Such a coated steel sheet can then be mechanically pressed/formed/rolled/hydroformed/shaped either in hot or cold condition as shown in FIG. 2 and may subsequently be subjected to heat to cause thermite reaction as discussed in Equation 9:

$$Ti+C+Cr \rightarrow (Ti,Cr)C+Cr_3C_2+\square H \quad \text{Equation 9}$$

Subsequent layers of a desired exemplary structure such as a spiral or rifled barrel could be chosen similar to as discussed above to achieve better, different or increased heat transfer properties.

An excess amount of $TiO_2$ may also be used to produce a reaction zone comprising $TiAl+3TiB_2+5Al_2O_3$ and may produce fibrous Titanium Boride ($Ti_B$) fibers. Subsequent layers of a desired exemplary structure such as a spiral or rifled barrel could be chosen similar to as discussed above to achieve better, different or increased heat transfer properties.

In particular, FIG. 1A shows a simplified perspective view of a form structure 1 (e.g., a mandrel, a cylinder, a sheet) with spiraled grooves 3 and lands 5 used in making an exemplary composite structure, such as a rifled projectile firing barrel, used in a manufacturing process in accordance with one embodiment of the invention.

FIG. 1B shows an end view of the FIG. 1A spiral form structure in accordance with one embodiment of the invention.

FIG. 2 shows simplified drawings of the FIG. 1A/1B spiral form structure 1 used with an exemplary pressing guide structure 19 which can be used to press or dispose reactive layers 11 (e.g., a sheet or a sieve) into or onto spiraled grooves and lands formed into the exemplary form structure 1 in a manufacturing process in accordance with one embodiment of the invention. Form structure 1 can be made with a non-reactive material (e.g., ceramic) to prevent form structure 1 from reacting with reactive layers 11. In at least some embodiments, a refractory glass compound (e.g., a $SiO_2$ and $Al_2O_3$ compound) can be sprayed onto form structure 1 to prevent reactive layers 11 from reacting with or sticking to form structure 1. In alternative embodiments, reactive layers 11 can be pressed onto form structure 1 through flow forming.

Figure 3:
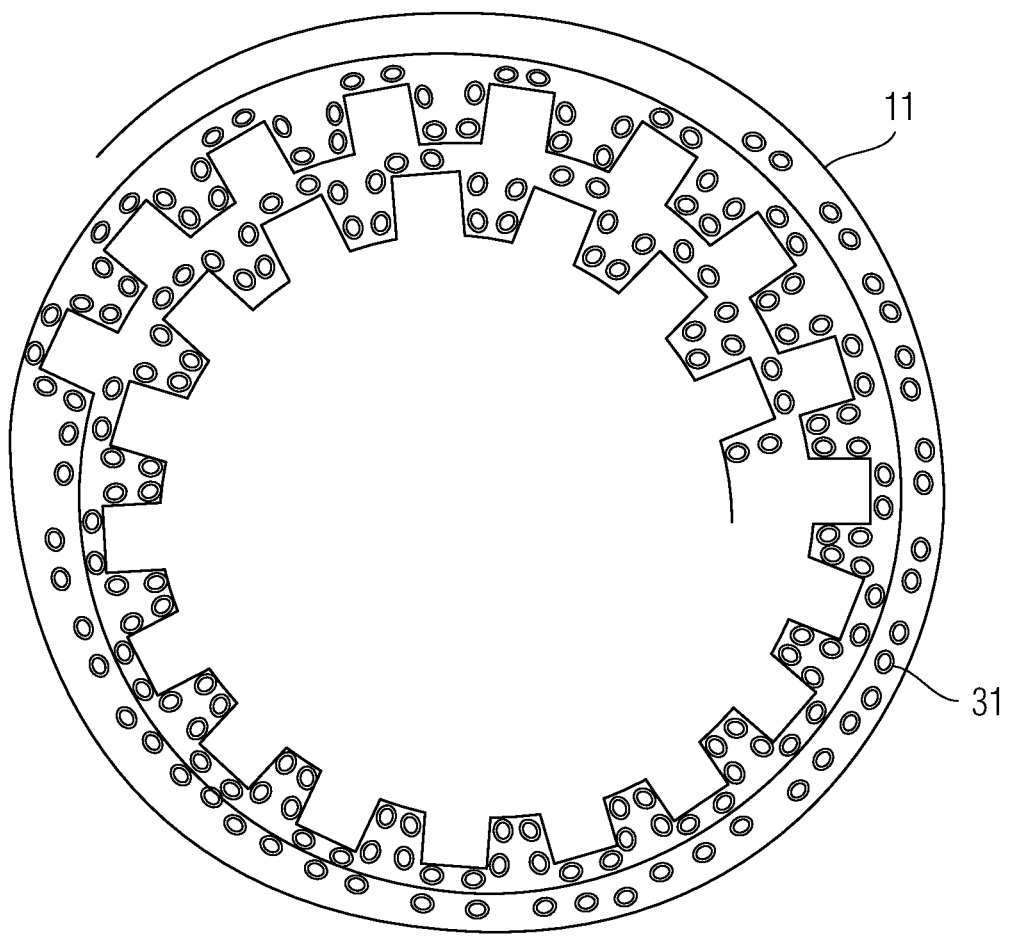
FIG. 3 shows a simplified exploded end view diagram showing multiple layers which have been pressed onto the FIGS. 1A/1B and FIG. 2B form using the FIG. 2A pressing guide gear or press with a reactive powder inserted between each layer.

FIG. 3 shows a simplified exploded end view diagram showing reactive layers 11 which have been pressed onto the FIGS. 1A/1B and FIG. 2B form using the FIG. 2A pressing guide gear or press in a manufacturing process in accordance with one embodiment of the invention. A first reactive powder mixture 31 can be spread within reactive layers 11 to adjust the compounds from the resulting reactions. In embodiments where reactive layers 11 comprised of a sieve, first reactive powder mixture 31 can fill in gaps of the sieve.

Figure 4:
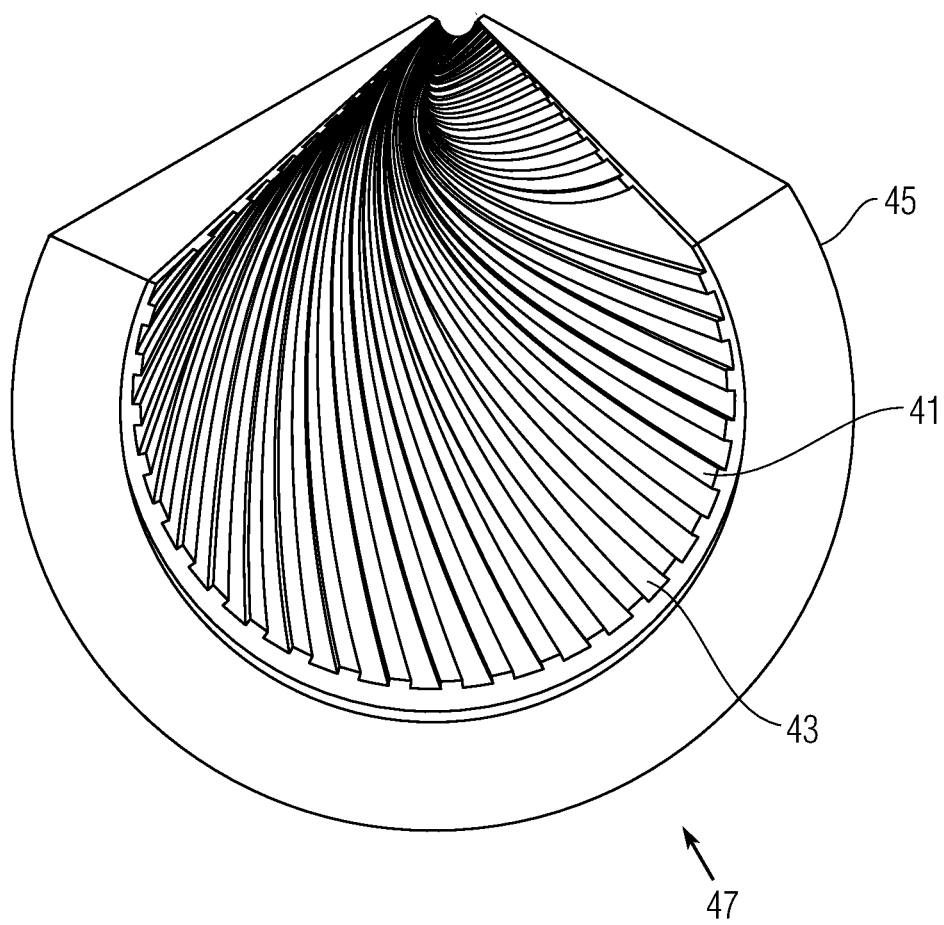
FIG. 4 shows a perspective partial cut-away view of an exemplary rifle barrel showing exemplary grooves and lands which is representative of a type of rifle barrel that can be manufactured in accordance with an embodiment of the invention.

FIG. 4 shows a perspective partial cut-away view of an exemplary rifle barrel showing exemplary grooves and lands which is representative of a type of rifle barrel that can be manufactured in accordance with one embodiment of the invention.

FIG. 5 shows an exemplary composite formation assembly including an induction heating coil 55 and a clamp mechanism 51. A form structure 1 covered with reactive layers 11 (assembled as shown in FIG. 2) can be placed in an inner cavity of an outer barrel 45 with a similar fit. A clamp mechanism 51 surrounding outer barrel 45 can be compressed by clamps 53 such that reactive layers 11 are tightly held an inner surface of outer barrel 45. Induction heating coil 55 can loop around the outer barrel several times to heat the components within loops and provide energy needed to start the reactions within the reacting layers 11. Once reacting layers 11 are done reacting, clamps 53 can be loosened so that form structure 1 can be removed from the assembly. In at least some embodiments, clamp mechanism 51 can be made of a ceramic material to prevent the clamp mechanism 51 from being heated by induction coil 55. In alternative embodiments, clamp mechanism 51 and clamps 53 can be replaced by shrink fitting form structure 1 and reactive layers 11 into outer barrel 45. In alternative embodiments, bushings can be used to create an interference fit (e.g., as described in U.S. Pat. Pub. No. US 2009/0304315A1) between a reactive bushing (e.g., a barrel liner) and reactive layers to maintain compressive force during reaction. In alternative embodiments, induction heating coil 55 can be replaced by an induction heating source (not shown) within form structure 1 so that heat from the induction heating source travels outwards from the form structure 1. In some embodiments, reactive layers 11 can include a plurality of intertwining spirals (e.g., multiple sheets of reactive layers).

FIG. 6 shows an exemplary composite formation assembly including a first, second, and third tube 75, 79, 83 (e.g., cylindrical sheet, cylindrical sieve, cylindrical honeycomb array) and a first, second, and third reactive powder mixture 31, 77, 8. A form structure 1 can be covered with reactive layers 11 (e.g. steel) with a first reactive powder mixture 31 (e.g., TiNiC, TiCCr, etc.) inserted between reactive layers 11. The reactive layers 11 can be placed within a first tube (e.g., a nickel based super alloy). A second reactive powder mixture (e.g., TiNiC, TiCCr, etc.) can be placed around the first tube, which can be inserted into a second tube. A third reactive powder mixture (e.g., TiNiC, TiCCr, etc.) can be placed around the second tube, which can be inserted into a third tube. The tubes, powder mixtures, and reactive layers 11 can be held together by a clamping mechanism (e.g., as shown in FIG. 5), a shrink fit, etc. Applying a heat source (e.g., induction heating, resistance heating, microwave heating, etc.) can trigger reactions throughout the composite formation assembly caused by exothermal chain reactions in the materials. These reactions between the tubes can form metallurgical bonds between the various adjacent tubes. In some embodiments, each of the reactions within each tube can be triggered in separate stages, such as triggering the reactions between the first tube 75, reactive layers 11, and first reactive powder mixture 31 before inserting the first tube 75 into the second tube 79. Different materials can be selected for each reactant such that the corresponding regions have special properties. For example, selecting reactive layers 11 comprising steel and first reactive powder mixture 31 comprising titanium and carbon mixture can produce an inner layer comprising a titanium carbide compound which can prevent unwanted heat transfer and reduce wettability to prolong the operating life of the composite formation assembly layers. Selecting a third tube 83 comprising copper and third reactive powder mixture 81 comprising a titanium, copper, and carbon mixture can allow heat that reaches third tube 83 to quickly dissipate to a surrounding environment. In some embodiments, fins can be added to the outermost tube (e.g., third tube 83) to facilitate heat exchange. Including cobalt in a first, second, or third reactive powder mixture 31, 77, 81 can prevent void formation by filing gaps (e.g., between reactive layers 11) and also improve mechanical strength. Selecting first tube comprising a steel-nickel superalloy can increase mechanical strength while facilitating heat transfer. In biological applications, titanium implants suffer degradation from exposure to biological fluids and other biological responses. To avoid this problem in dental and orthopedic applications, exemplary reactive layers can be used to form a coating (e.g., titanium carbide) that can improve implant hardness, biocompatibility through surface stability, and osseo-integration (e.g., through improved bone growth).

Figure 7C:
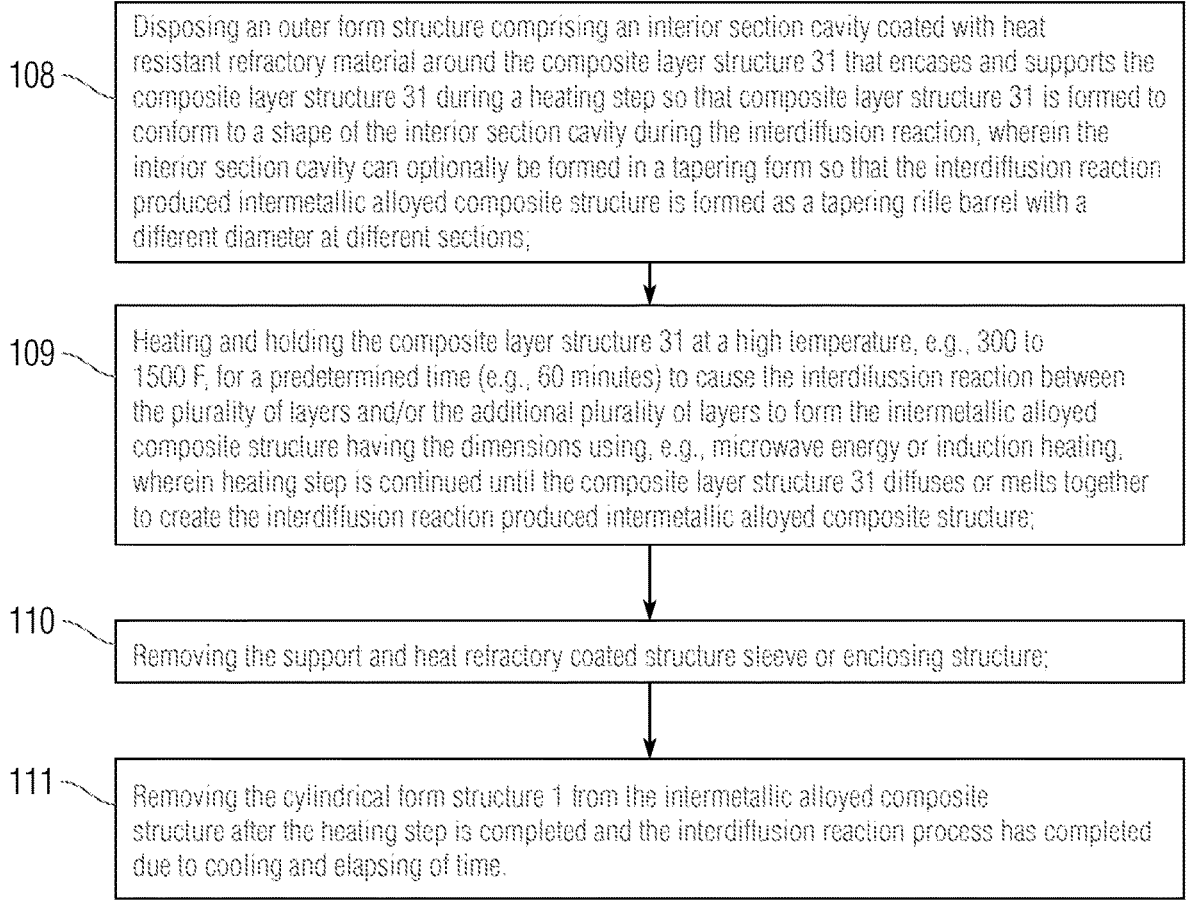

FIGS. 7A-7E show exemplary methods of manufacturing in accordance with various embodiments of the invention. In particular, FIG. 7A shows a method including the following steps: Step 97: Determine material properties and dimensions of an inter-diffusion reaction produced intermetallic alloyed composite structure comprising inter-diffusion reaction products formed from the inter-diffusion reaction of a plurality of layers (e.g., thin layers having exemplary thicknesses of, e.g., 0.016 mm to 0.025 mm), the plurality of layers comprising metal layers, metal oxide layers, or combinations of metal and metal oxide layers, the intermetallic alloyed composite structure (e.g., rifle barrel) is formed to internally receive and rotatably convey a projectile structure along a center axis running through the intermetallic alloyed structure using a combustion gas byproduct passed through the alloyed composite structure, the material properties including high temperature properties (e.g., melting point from application of one or more propellant combustion byproducts and friction from passage of the projectile), hardness, high temperature tensile strength, heat transfer or thermal conductivity properties, creep strength, wear resistance against a specified material (e.g., the projectile passing against or through the alloyed composite structure a specified times and frequency), and/or equivalent heat treatment properties, etc. At Step 99: Selecting each of the plurality of layers that are combined to produce the intermetallic alloyed composite structure using the inter-diffusion reaction (e.g., heat reaction such as, e.g., thermite reaction) that produces the predetermined inter-diffusion reaction products within the intermetallic alloyed composite structure with the material properties, wherein the plurality of layers comprise a first, second and third layer, the dimensions comprising a thickness from at least one rifling land or groove within the intermetallic alloyed composite structure to an outer surface of the intermetallic alloyed composite structure. At Step 100: Selecting and providing the first layer to produce the inter-diffusion reaction products with the second and third layer comprising one of, e.g., a first aluminum thin foil layer, tantalum thin foil layer, or tungsten thin foil layer. At Step 102: Selecting and disposing the second layer or a metal oxide onto the first layer that is selected to produce the inter-diffusion reaction products with the first and third layer comprising one of, e.g., disposing a nickel thin foil layer onto the first aluminum thin foil layer; or electroplating a nickel alloy metal layer onto the first layer comprising the first aluminum thin foil layer by disposing nickel oxide NiO particles onto the first layer comprising the first aluminum thin foil layer; or application of a titanium oxide $TiO_2$ surface coating on the first layer comprising the first aluminum thin foil layer; or disposing tungsten oxide $WO_3$ coating on the first aluminum thin foil or the tantalum thin foil layer; or disposing a cobalt oxide CoO coating on the first aluminum thin foil layer. At Step 104: Selecting and disposing the third layer on the second layer that is selected to produce the inter-diffusion reaction products with the first and second layer comprising one of, e.g., a second aluminum thin foil layer onto the nickel thin foil layer; or an application of boron oxide $B_2O_3$ nano fibers on the titanium oxide $TiO_2$ surface coating; or disposing a tantalum thin foil layer on the tungsten oxide $WO_3$ coating; or disposing a third aluminum thin foil layer on the cobalt oxide CoO coating. This method of FIG. 7A continues in FIG. 7B.

FIG. 7B shows additional steps including: Step 105: Providing a cylindrical form structure 1 formed with a plurality of spiraled or rifled the lands 5 and grooves 3 that define and correspond to an interior wall of the intermetallic alloyed composite structure that is adapted to internally receive and rotatably convey the projectile structure therein using the combustion gas byproduct, the cylindrical form structure 1 has a protective coating applied to an outer surface of the cylindrical form 1 that forms a protective refractory coating or barrier that prevents inter-diffusion reaction bonding between the cylindrical form structure 1 and the plurality of layers, wherein the cylindrical form structure diameter and shape are selected based on an application comprising manufacturing of a projectile system, e.g. the rifle barrel, configured to rotatably receive the projectile structure. Step 107: Disposing lengths of the plurality of layers into a composite layer structure 31 and wrapping the composite layer structure 31 onto an outer surface of the cylindrical form structure 1 comprising the lands 5 and grooves 3 structure and then pressing the composite layer structure 31 into and onto the grooves 3 and lands 5 respectively by, e.g., cold/hot rolling or hydroforming, so that the composite layer structure 31 is pressed into the grooves 3 and onto the lands 5 of the cylindrical form structure 1, wherein the lengths of the plurality of layers are such that the wrapping of the composite layer structure 31 continues until gaps defined by distances between sides of the plurality of layers disposed in the grooves of the cylindrical form structure 1 are filled with portions of the plurality of layers, the lengths of the plurality of layers are further defined by lengths required to produce a predetermined width of another portion of the plurality of layers from an outer surface of at least one of the lands to an external surface of the composite layer structure 31 after the wrapping step is completed, wherein the predetermined width is further determined based at least in part on one or more of the material properties of the alloyed composite structure, wherein optionally the composite layer structure further comprises an additional plurality of layers that include different or additional layers which are added or disposed via an additional wrapping step on top of or as an extension thereof to the first, second and third layers so that an outer section of the composite layer structure has different one or more of the material properties than the first, second, and third layers than the first, second, or third layers, wherein the different one or more of the material properties comprise, e.g., a different heat transfer, hardness, creep strength, or heat expansion, form factor affecting material properties such as heat transfer due to tapering of a portion of the composite structure. The method of FIGS. 7A and 7B continues in FIG. 7C.

FIG. 7C continues the processes of FIGS. 7A and 7B and discloses the following steps: Step 108: Disposing an outer form structure comprising an interior section cavity coated with heat resistant refractory material around the composite layer structure 31 that encases and supports the composite layer structure 31 during a heating step so that composite layer structure 31 is formed to conform to a shape of the interior section cavity during the inter-diffusion reaction, wherein the interior section cavity can optionally be formed in a tapering form so that the inter-diffusion reaction produced intermetallic alloyed composite structure is formed as a tapering rifle barrel with a different diameter at different sections. At Step 109: Heating and holding the composite layer structure 31 at a high temperature, e.g., 300 to 1500° F., for a predetermined time (e.g., 60 minutes) to cause the inter-diffusion reaction between the plurality of layers and/or the additional plurality of layers to form the intermetallic alloyed composite structure having the above referenced exemplary dimensions using, e.g., microwave energy or induction heating, wherein the heating step is continued until the composite layer structure 31 diffuses or melts together to create the inter-diffusion reaction produced intermetallic alloyed composite structure. At Step 110: Removing the support and heat refractory coated structure sleeve or enclosing structure. At Step 111: Removing the cylindrical form structure 1 from the intermetallic alloyed composite structure after the heating step is completed and the inter-diffusion reaction process has completed due to cooling and elapsing of time.

FIG. 7D continues with optional steps associated with various FIGS. 7A through 7C method steps including: Optional Step 112: wherein when the first layer comprises the first aluminum thin foil layer, the first aluminum thin foil layer is coated with the Nickel Oxide NiO particles, heating the composite structure 31 at sufficiently high temperature for a predetermined time to cause a thermite reaction of Equation 1.

and subsequent inter-diffusion reaction between the aluminum and nickel layer to for intermetallic compounds and Aluminum oxide $Al_2O_3$ particles to produce the inter-diffusion reaction produced intermetallic alloyed composite structure.

Optional step 114: Wherein when the second layer comprises $TiO_2$, heating composite structure 31 at a sufficiently high temperature for a specified time sufficient to cause a thermite reaction of Equation 2 and subsequent inter-diffusion reaction between the aluminum and titanium layers to form intermetallic compounds of titanium and aluminum, and aluminum oxide $Al_2O_3$ particles to produce the inter-diffusion reaction produced intermetallic alloyed composite structure.

Optional Step 116: wherein when the third layer comprises an application of $B_2O_3$ nano fibers on the second layer which comprises the $TiO_2$ surface coating, heating the composite structure 31 at a sufficiently high temperature for a sufficient time to cause a thermite reaction of Equation 3 and subsequent inter-diffusion reaction between the aluminum and titanium with heat of reaction $\Box H$ to form intermetallic compounds of Titanium and Aluminum, and Aluminum oxide $Al_2O_3$ and $TiB_2$ particles to produce the inter-diffusion reaction produced intermetallic alloyed composite structure.

Although the invention has been described in detail with reference to certain preferred embodiments, variations and modifications exist within the spirit and scope of the invention as described and defined in the following claims.

The invention claimed is:

1. A method of manufacturing of a projectile firing structure comprising:
   determining a plurality of material properties of a projectile firing structure comprising a rifled barrel including thermal conductivity, wear, and tensile strength;
   providing and wrapping a plurality of thermally reactive layers onto a cylindrical press form structure, the cylindrical press form structure comprising a plurality of spiraled grooves and lands disposed on an outer surface of the cylindrical press form structure, the thermally reactive layers comprising metal or metal oxides that when heated produce thermal diffusion byproducts in a composite structure forming the rifled barrel having the plurality of material properties;
   disposing an enclosing structure around the thermally reactive layers wrapped around the cylindrical press form structure; and
   heating the plurality of thermally reactive layers at a sufficient temperature and time so that the plurality of thermally reactive layers thermally react via thermal diffusion forming the rifled barrel having the plurality of material properties.

2. A method of manufacturing of a projectile firing structure comprising:
   determining a plurality of material properties of a projectile firing structure including thermal conductivity, wettability, and tensile strength;
   providing a first, second, and third hollow cylinder, a plurality of reactive layers, and a first, second, and third reactive powder mixture;
   forming a composite assembly by forcing the plurality of reactive layers into a first predetermined shape while dispersing the first reactive powder mixture between each reactive layer of the plurality of reactive layers, wherein the first predetermined shape comprises a fourth hollow cylinder with plurality of lands and grooves along an inner surface of the fourth hollow cylinder;

forming a first composite structure by forcing the composite assembly into the first hollow cylinder with an interference fit;

forming a second composite structure by dispersing a second reactive powder mixture on an outer surface of the first hollow cylinder and on an inner surface of the second hollow cylinder and forcing the first composite structure into the second hollow cylinder with an interference fit;

forming a third composite structure by dispersing a third reactive powder mixture on an outer surface of the second hollow cylinder and on an inner surface of the third hollow cylinder and forcing the second composite structure into the third hollow cylinder with an interference fit; and heating the third composite structure to initiate a self-sustaining exothermic reaction that fuses the plurality of reactive layers, the first reactive powder mixture, and the first hollow cylinder, fuses the first hollow cylinder, the second reactive powder mixture, and the second hollow cylinder, and fuses the second hollow cylinder, the third reactive powder mixture, and the third hollow cylinder;

wherein the plurality of reactive layers comprises steel;

wherein the first hollow cylinder comprises a nickel based super alloy;

wherein the second hollow cylinder comprises titanium;

wherein the third hollow cylinder comprises copper;

wherein the first reactive powder mixture comprises titanium and carbon;

wherein the second reactive powder mixture comprises titanium, nickel, and carbon;

wherein the third reactive powder mixture comprises titanium, copper, and carbon.

\* \* \* \* \*